(12) United States Patent
Huang et al.

(10) Patent No.: US 11,397,776 B2
(45) Date of Patent: Jul. 26, 2022

(54) SYSTEMS AND METHODS FOR AUTOMATED INFORMATION RETRIEVAL

(71) Applicant: AT&T Intellectual Property I, L.P., Atlanta, GA (US)

(72) Inventors: Chih Chien Huang, Mountain View, CA (US); Jianxiong Dong, Pleasanton, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 153 days.

(21) Appl. No.: 16/264,205

(22) Filed: Jan. 31, 2019

(65) Prior Publication Data

US 2020/0250239 A1 Aug. 6, 2020

(51) Int. Cl.
*G06F 16/93* (2019.01)
*G06F 16/903* (2019.01)

(52) U.S. Cl.
CPC ........ *G06F 16/93* (2019.01); *G06F 16/90344* (2019.01)

(58) Field of Classification Search
CPC . G06F 16/93; G06F 16/90344; G06F 16/3347
See application file for complete search history.

(56) References Cited

U.S. PATENT DOCUMENTS

| | | | |
|---|---|---|---|
| 5,619,709 A | 4/1997 | Caid et al. | |
| 5,899,989 A | 5/1999 | Ikeuchi et al. | |
| 6,189,002 B1 | 2/2001 | Roitblat | |
| 6,523,026 B1 | 2/2003 | Gillis | |
| 6,766,316 B2 | 7/2004 | Caudill et al. | |
| 7,124,073 B2 | 10/2006 | Tokuda et al. | |

(Continued)

FOREIGN PATENT DOCUMENTS

CN 107491547 A 12/2017
WO WO 2008023470 A1 2/2008

(Continued)

OTHER PUBLICATIONS

Bellegarda, Exploiting latent semantic information in statistical language modeling, Proceedings of the IEEE 88.8 (2000): 1279-1296.

(Continued)

*Primary Examiner* — William B Partridge
*Assistant Examiner* — Aryan D Toughiry
(74) *Attorney, Agent, or Firm* — Amin, Turocy & Watson, LLP (57) ABSTRACT

An automated information retrieval system includes a processor coupled to a communications interface and a non-transitory memory. The processor is configured to read instructions from the non-transitory memory to cause the system to perform operations comprising receiving a term including a plurality of words and generating a plurality of word vectors corresponding to the plurality of words respectively. A plurality of term vectors associated with the term is generated using the plurality of word vectors based on a plurality of term vector rules respectively. A combination term vector associated with the term is generated by combining the plurality of term vectors. One or more search results from a database for the term are provided using the combination term vector.

20 Claims, 7 Drawing Sheets

(56) References Cited

U.S. PATENT DOCUMENTS

| | | | |
|---|---|---|---|
| 7,392,474 B2 | 6/2008 | Chen et al. | |
| 7,783,640 B2 | 8/2010 | Liao et al. | |
| 7,974,963 B2 | 7/2011 | Zhou et al. | |
| 8,185,378 B2 | 5/2012 | Burstein et al. | |
| 8,271,502 B2 | 9/2012 | Svore et al. | |
| 8,874,432 B2 | 10/2014 | Qi et al. | |
| 8,949,242 B1 | 2/2015 | Lin et al. | |
| 8,990,200 B1 | 3/2015 | Christensen et al. | |
| 9,679,256 B2 | 6/2017 | Briscoe et al. | |
| 9,704,098 B2 | 7/2017 | Waltinger | |
| 9,710,544 B1 | 7/2017 | Smith et al. | |
| 9,767,186 B2 | 9/2017 | Bhandari et al. | |
| 2012/0209847 A1* | 8/2012 | Rangan | G06F 16/3347 707/737 |
| 2014/0214402 A1 | 7/2014 | Diao et al. | |
| 2016/0042053 A1 | 2/2016 | De | |
| 2016/0196342 A1 | 7/2016 | Kim et al. | |
| 2018/0181673 A1 | 6/2018 | Liu | |
| 2019/0221204 A1* | 7/2019 | Zhang | G10L 15/16 |
| 2020/0151250 A1* | 5/2020 | Xu | G06N 3/0454 |
| 2020/0201908 A1* | 6/2020 | Ma | G06F 16/906 |
| 2020/0226126 A1* | 7/2020 | Zou | G06F 16/24578 |

FOREIGN PATENT DOCUMENTS

| | | |
|---|---|---|
| WO | WO 2012134396 A1 | 10/2012 |
| WO | WO 2018043598 A1 | 3/2018 |
| WO | WO 2018066445 A1 | 4/2018 |

OTHER PUBLICATIONS

Mitchell, et al., Language models based on semantic composition, Proceedings of the 2009 Conference on Empirical Methods in Natural Language Processing: vol. 1-vol. 1. Association for Computational Linguistics, 2009.

Rus, et al., Semilar: The semantic similarity toolkit, Proceedings of the 51st Annual Meeting of the Association for Computational Linguistics: System Demonstrations. 2013.

Levy, et al., Improving distributional similarity with lessons learned from word embeddings, Transactions of the Association for Computational Linguistics 3 (2015): 211-225.

Ritter, et al., Self-organizing semantic maps, Biological cybernetics 61.4 (1989): 241-254.

Garg, et al., Review of text reduction algorithms and text reduction using sentence vectorization, International Journal of Computer Applications 107.12 (2014).

Jung, et al., Automatic text summarization using two-step sentence extraction, Asia Information Retrieval Symposium. Springer, Berlin, Heidelberg, 2004.

Dong, et al., Word2visualvec: Image and video to sentence matching by visual feature prediction, arXiv preprint arXiv:1604.06838 (2016).

Wang, et al., Bilateral multi-perspective matching for natural language sentences, arXiv preprint arXiv:1702.03814 (2017).

* cited by examiner

SYSTEMS AND METHODS FOR AUTOMATED INFORMATION RETRIEVAL

FIELD OF THE DISCLOSURE

This disclosure relates generally to automated information retrieval systems and, more particularly, to systems and methods for semantic representation of phrases and sentences in automated information retrieval systems.

BACKGROUND

Automated information retrieval systems providing search and content discoveries are used in many products and services, including, for example, TV set-top boxes, social networks, online forums, and various websites. Typically, such an automated information retrieval system need to process a large volume of natural language data (e.g., unstructured data like text data) for analytics needs, which is time-consuming. Furthermore, keyword matching techniques are often used for search and content discoveries. However, search results using exact or fuzzy keyword matches may not provide the desired semantically relevant results. For example, for a customer looking for movies and TV shows like a known movie, search results using keyword matching (e.g., in titles) may not provide the desired relevant results.

Therefore, there is a need for an improved automated information retrieval system that provides search and content discovery with improved accuracy and speed and reduced computational cost.

SUMMARY

Automated information retrieval systems are described. In various embodiments of the systems and methods disclosed herein, an automated information retrieval system is configured to perform operations including receiving a first term including a plurality of words; generating, using a combination term vector generator, a first combination term vector associated with the first term, and providing a search result from a database for the first term based on the first combination term vector. The generating the first combination term vector includes: generating a plurality of word vectors corresponding to the plurality of words respectively; generating a plurality of term vectors associated with the first term using the plurality of word vectors based on a plurality of term vector rules respectively; and generating the combination term vector associated with the first term by combining the plurality of term vectors based on a combination rule.

In some embodiments, the plurality of term vector rules include at least one of an elementwise minimum rule or an elementwise maximum rule, wherein the elementwise minimum rule provides that each element of a corresponding term vector includes a minimum value of corresponding elements of the plurality of word vectors, and wherein the elementwise maximum rule provides that each element of a corresponding term vector includes a maximum value of corresponding elements of the plurality of word vectors.

In some embodiments, the plurality of term vector rules include an elementwise mean value rule, wherein the elementwise mean value rule provides that each element of a corresponding term vector includes a mean value based on corresponding elements of the plurality of word vectors.

In some embodiments, the elementwise mean value rule is an elementwise weighted mean value rule providing a weighted mean value using a plurality of weights for the corresponding elements.

In some embodiments, the plurality of weights are based on inverse document frequencies (IDF) of the plurality of words respectively.

In some embodiments, the operations further comprise: normalizing the plurality of term vectors to generate a plurality of normalized term vectors; and generating the first combination term vector by combing the plurality of normalized term vectors.

In some embodiments, the combination rule provides that the first combination term vector is generated by concatenating the plurality of normalized term vectors.

In some embodiments, the operations further comprise: preprocessing the database to generate a vectorized database, wherein the preprocessing the database include: for each document of the database, generating a document vector using the combination term vector generator; and storing the document vector as an index to the corresponding document.

In some embodiments, the operations further comprise: generating similarity scores between the document vectors and the first combination term vector; and providing the search result including one or more documents based on the similarity scores.

Embodiments of the present disclosure may be understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Embodiments of the present disclosure include automated information retrieval systems and methods that may be used, for example, to perform search and content discoveries. As discussed above, search engines based on strict keyword matches may not provide a user the relevant results that are semantically relevant to a search term, and there exists a need for further improvements in the information retrieval technology. The systems and methods of the present disclosure provide for an automated information retrieval system that includes a combination term vector generator for generating a combination term vector for a term including a plurality of words. The combination term vector generator may generate a plurality of word vectors corresponding to the plurality of words respectively, generate a plurality of term vectors associated with the first term using the plurality of word vectors based on a plurality of term vector rules respectively; and generate the combination term vector associated with the first term by combining the plurality of term vectors based on a combination rule. A search for semantically relevant results for the term may be performed based on the combination term vector. By providing a discriminative and representative vector for the term in the semantic space at the term level, faster and more efficient searches for semantically relevant results are provided. Furthermore, weightings that are inverse to word frequencies are applied to form the term level vector, which further improves the efficiency of the searches.

Figure 1:
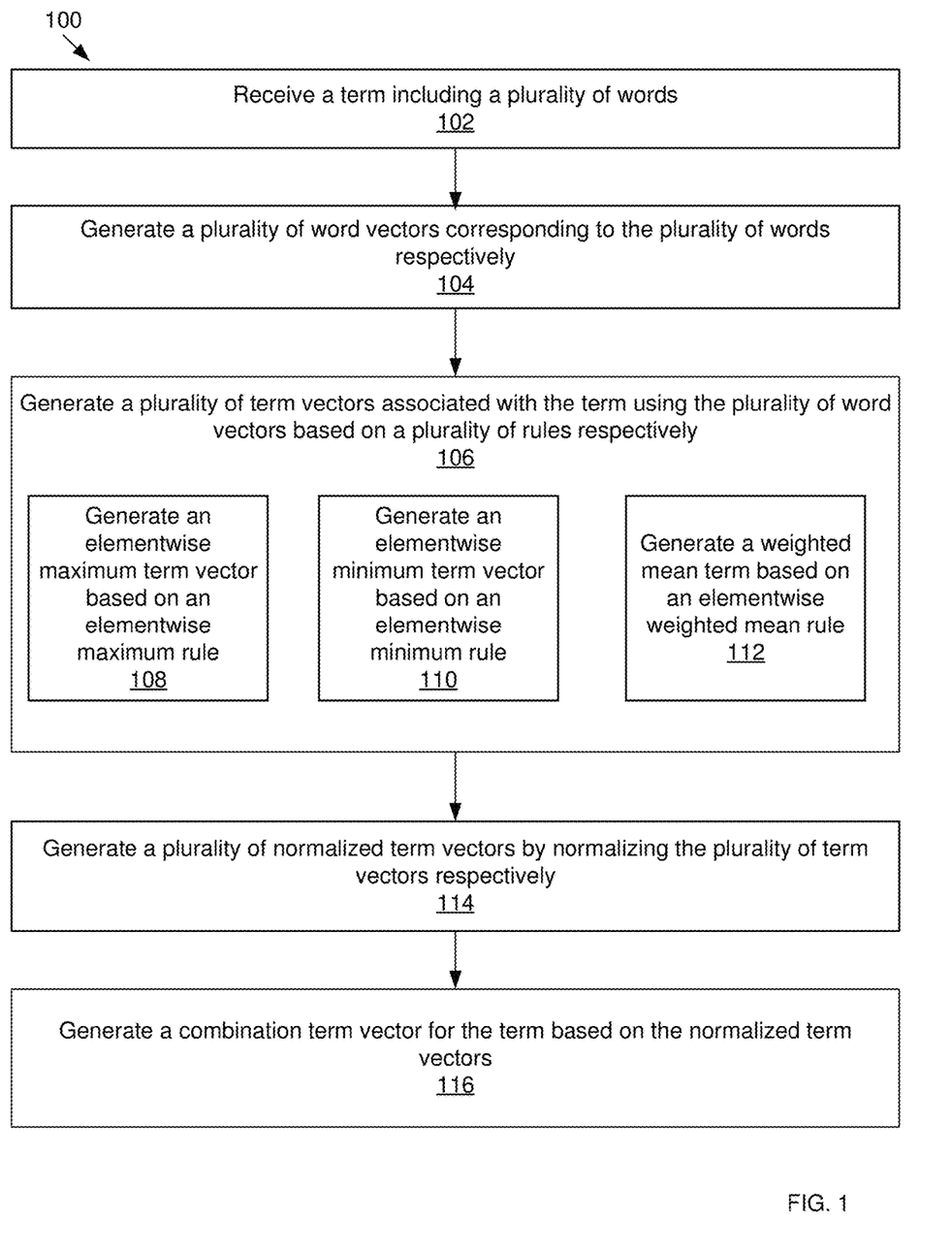
FIG. 1 is a flow chart illustrating a method for generating a combination term vector in an automated information retrieval system according to some embodiments.
Figure 2:
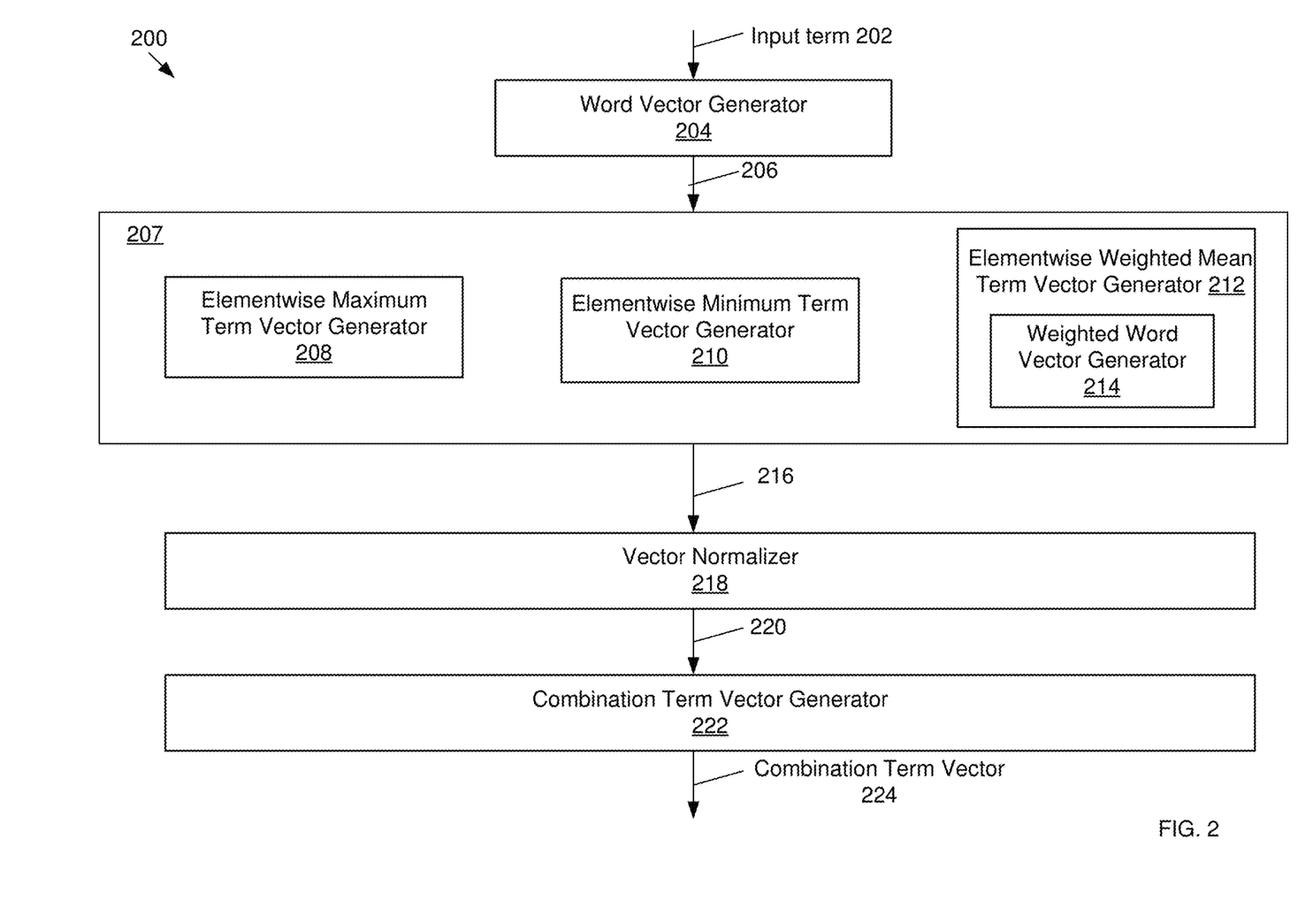
FIG. 2 is a schematic view illustrating a combination term vector generation system according to some embodiments.
Figure 3:
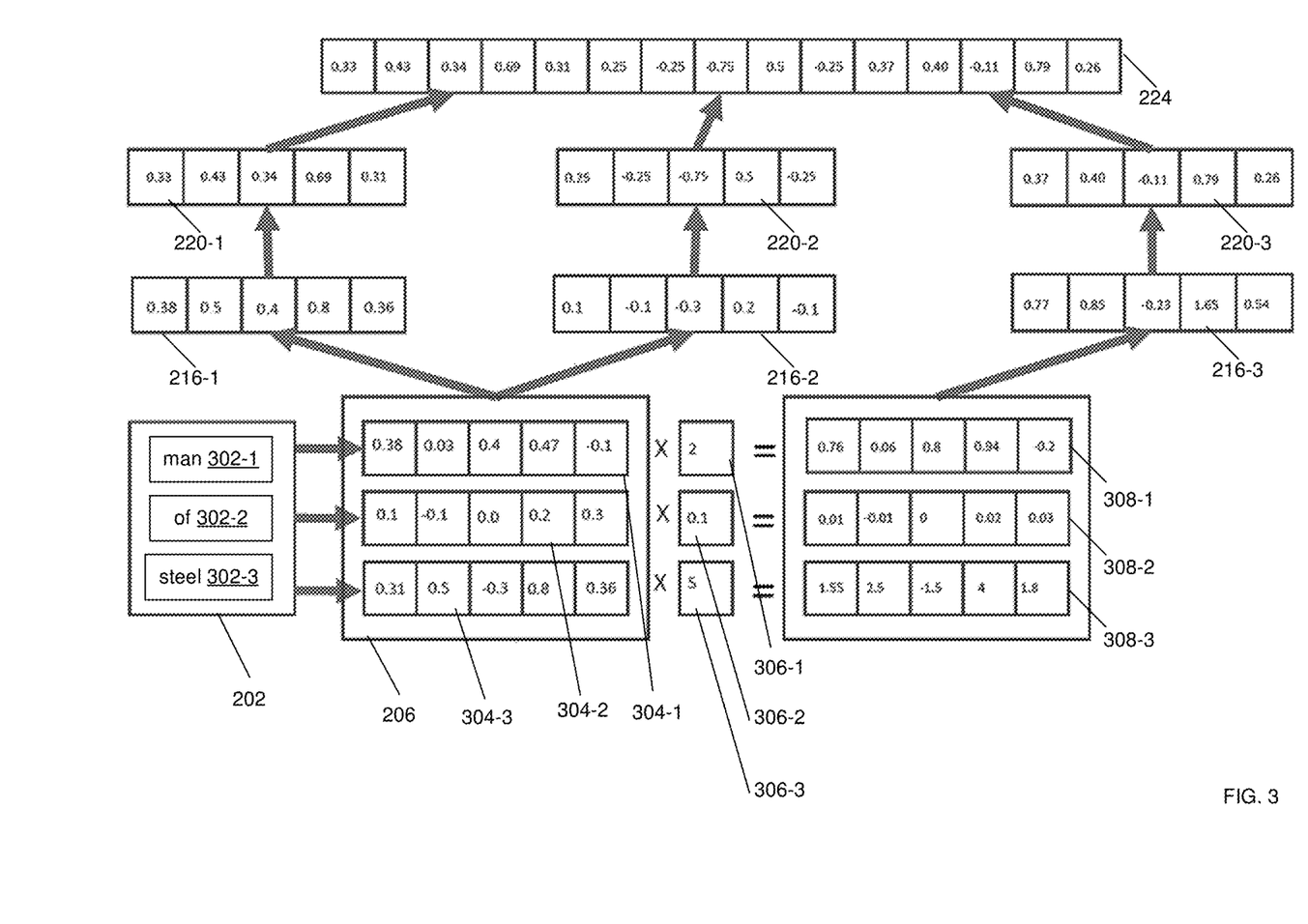
FIG. 3 is a schematic view illustrating vectors used in the method for generating a combination term vector of FIG. 1 according to some embodiments.

Referring now to the examples of FIGS. 1, 2, and 3, a method 100 for generating a combination term vector for an input term is illustrated. The input term includes a sequence of words, and the combination term vector includes a discriminative semantic vector for the input term. FIG. 2 illustrates a combination term vector generation system 200 for generating a combination term vector, and FIG. 3 illustrates example vectors used for generating the combination term vector.

The method 100 begins at block 102, where a combination term vector generation system (e.g., located in a user device or a system provider device) receives an input term including a plurality of words. Referring to the example of FIG. 2, the combination term vector generation system 200 receives an input term 202 (also referred to as term 202). The input term 202 may include a phrase, a complete sentence, or any other suitable combination of words. In the example of FIG. 3, the input term 202 includes a term 202 ("man of steel") including a plurality of words including word 302-1 ("man"), word 302-2 ("of"), and word 302-3 ("steel").

The method 100 may proceed to block 102, where for each word of the input term 202, a word vector is generated. Referring to the example of FIG. 2, a word vector generator 204 may generate a plurality of word vectors 206 for the words of the input term 202 respectively. In the example of FIG. 3, the plurality of word vectors 206 include word vector 304-1 (e.g., [0.38, 0.03, 0.4, 0.47, −0.1]), word vector 304-2 (e.g., [0.1, −0.1, 0.0, 0.2, 0.3]), and word vector 304-3 (e.g., [0.31, 0.5, −0.3, 0.8, 0.36]) corresponding to words 302-1, 302-2, and 302-3 respectively. Each word vector includes N elements (e.g., N=5), and each element is a number (e.g., a real number).

Various word embedding techniques for representing words as vectors may be used by the word vector generator 204 to generate the word vector. The word vector generator 204 may use language modeling and feature learning techniques in natural language processing (NLP) to map words and/or phrases from the vocabulary to vectors of real numbers. Such a mapping involves a mathematical embedding from a space with one dimension per word to a continuous vector space (also referred to as a semantic space) with a much lower dimension. Various methods may be used to generate the mapping, including, for example, neural networks, dimensionality reduction on the word co-occurrence matrix, probabilistic models, explainable knowledge base methods, explicit representation in terms of the context in which words appear, etc.

The method 100 may proceed to block 106, where a plurality of term vectors associated with the input term is generated based on a plurality of term vector rules respectively. Each term vector rule may specify how a corresponding term vector representing the term is generated based on the plurality of word vectors 206. The term vector rules may include, e.g., an elementwise maximum rule, an elementwise minimum rule, an elementwise mean rule, an elementwise weighted mean rule, any other suitable rules, and/or a combination thereof. In the combination term vector generator system 200 of FIG. 2, a term vector generator 207 receives the plurality of word vectors 206, and generates a plurality of term vectors 216 based on a plurality of term vector rules respectively.

As shown in FIG. 1, block 106 may include process 108 that generates an elementwise maximum term vector based on an elementwise maximum rule. In the examples of FIGS. 2 and 3, at process 108, an elementwise maximum term vector generator 208 receives the plurality of word vectors 206, and generates an elementwise maximum term vector 216-1 (e.g., [0.38, 0.5, 0.4, 0.8, 0.36]. Based on an elementwise maximum rule, each element of the elementwise maximum term vector 216-1 is the maximum value of the corresponding elements of the word vectors 304-1, 304-2, and 304-3. For example, the first element of the elementwise maximum term vector 216-1 has a value of 0.38, which is the maximum value of the first elements (e.g., 0.38, 0.1, 0.31) of the word vectors 304-1, 304-2, and 304-3.

In some embodiments, block 106 may include process 110 that generates an elementwise minimum term vector based on an elementwise minimum rule. In the examples of FIGS. 2 and 3, at process 110, an elementwise minimum term vector generator 208 receives the plurality of word vectors 206, and generates an elementwise maximum term vector 216-2 (e.g., [0.1, −0.1, −0.3, 0.2, −0.1]). Based on an elementwise minimum rule, each element of the elementwise minimum term vector 216-2 is the minimum value of the corresponding elements of the word vectors 304-1, 304-2, and 304-3. For example, the second element of the elementwise minimum term vector 216-2 has a value of −0.1, which is the minimum value of the second elements (e.g., 0.03, −0.1, 0.5) of the word vectors 304-1, 304-2, and 304-3.

In some embodiments, block 106 may include process 112 that generates an elementwise weighted mean term vector based on an elementwise weighted mean rule. In the examples of FIGS. 2 and 3, at process 112, an elementwise weighted mean term vector generator 212 receives the plurality of word vectors 206, and generates an elementwise weighted mean term vector 216-3 (e.g., [0.77, 0.85, −0.23, 1.65, 0.54]). Based on an elementwise weighted mean rule, each element of the elementwise minimum term vector 216-3 is a weighted mean value of the corresponding elements of the word vectors 304-1, 304-2, and 304-3.

In some embodiments, a weighted word vector generator 214 may apply weights 306-1, 306-2, and 306-3 (e.g., 2, 0.1, and 5) to word vectors 304-1, 304-2, and 305-3 respectively to generate weighted word vectors 308-1, 308-2, and 308-3. Weights 306-1, 306-2, and 306-3 may be inverse document frequency (IDF) weights, which are generated using an inverse function of the number of documents in a document set in which a corresponding word (e.g., "man," "of," "steel") occurs. In other words, the IDF method for providing the IDF weights diminishes the weight of terms that occur very frequently (e.g., less meaningful for distinguishing relevant and non-relevant documents) in the document set and increases the weight of terms that occur rarely (e.g., more meaningful for distinguishing relevant and non-relevant documents). For example, word 302-2 (e.g., "of") has a document frequency higher than word 302-3 (e.g., "steel"), and therefore has an IDF weight 306-2 (e.g., 0.1) that is less than the IDF weight 306-3 (e.g., 5) of word 302-3.

In the example of FIG. 3, an IDF weight 306-1 (e.g., 2) associated with the word 302-1 (e.g., "man") is applied to the corresponding word vector 304-1 (e.g., [0.38, 0.03, 0.4, 0.47, −0.1]) to generate a weighted word vector 308-1 (e.g., [0.76, 0.06, 0.8, 0.94, −0.2]). An IDF weight 306-2 (e.g., 0.1) associated with the word 302-2 (e.g., "of") is applied to the corresponding word vector 304-2 (e.g., [0.1, −0.1, 0.0, 0.2, 0.3]) to generate a weighted word vector 308-2 (e.g., [0.01, −0.01, 0, 0.02, 0.03]). An IDF weight 306-3 (e.g., 5) associated with the word 302-3 (e.g., "steel") is applied to the corresponding word vector 304-3 (e.g., [0.31, 0.5, −0.3, 0.8, 0.36]) to generate a weighted word vector 308-3 (e.g., [1.55, 2.5, −1.5, 4, 1.8]).

The elementwise weighted mean term vector generator 212 may generate elementwise weighted mean term vector 216-3, where each element of the elementwise weighted mean term vector 216-3 is a mean value of the corresponding elements of the weighted word vectors 308-1, 308-2, and 308-3. For example, the third element of the elementwise weighted mean term vector 216-3 (e.g., −0.23) is the mean of the corresponding third elements (e.g., 0.8, 0, −1.5) of weighted word vectors 308-1, 308-2, and 308-3.

It is noted that while in the examples of FIGS. 2 and 3, the term vector generator 207 generates three term vectors 216, in various embodiments, the term vector generator 207 may generate any suitable number (e.g., two, three, four, etc.) of different term vectors 216 based on respective term vector rules.

The method 100 may proceed to block 114, where a plurality of normalized term vectors are generated by normalizing the plurality of term vectors respectively. In the examples of FIGS. 2 and 3, a vector normalizer 222 of the combination term vector generator 200 receives a plurality of term vectors 216 (e.g., term vectors 216-1, 216-2, and 216-3), and generates a plurality of normalized term vectors 220 (e.g., normalized vectors 220-1, 220-2, and 220-3). The normalized vectors 220-1, 220-2, and 220-3 have the same direction as the corresponding term vectors 216-1, 216-2, and 216-3 respectively but with the norm (length) of 1.

The method 100 may proceed to block 116, where a combination term vector is generated for the term based on the normalized term vectors. In the examples of FIGS. 2 and 3, a combination term vector generator 222 receives normalized term vectors 220 (e.g., normalized vectors 220-1, 220-2, and 220-3), and generates a combination term vector 224 based on a combination rule. The combination rule may specify how the combination term vector 224 is generated using the normalized term vectors 220. In some embodiments, the combination rule may provide that the combination term vector 224 is generated by concatenating two or more of the normalized vectors in a particular order. In the example of FIG. 3, a combination rule provides that the combination term vector 224 (e.g., [0.33, 0.43, 0.34, 0.69, 0.31, 0.25, −0.25, −0.75, 0.5, −0.25, 0.37, 0.40, −0.11, 0.79, 0.26]) is generated by concatenating the normalized elementwise maximum term vector 220-1, normalized elementwise minimum term vector 220-2, and normalized elementwise weighted mean term vector 220-3 in that particular order. In other examples, the combination rule may provide that the combination term vector 224 is generated by concatenating two or more of the normalized term vectors in another order (e.g., by combing the normalized elementwise weighted mean term vector 220-3 followed by the normalized elementwise maximum term vector 220-1).

In various embodiments, a combination term vector is generated using the term vectors based on the combination rule, which may include one or more combination computation rules including e.g., concatenation, elementwise multiplication, elementwise division, elementwise addition, elementwise subtraction, any other suitable combination computation rules, and/or a combination thereof.

Figure 4:
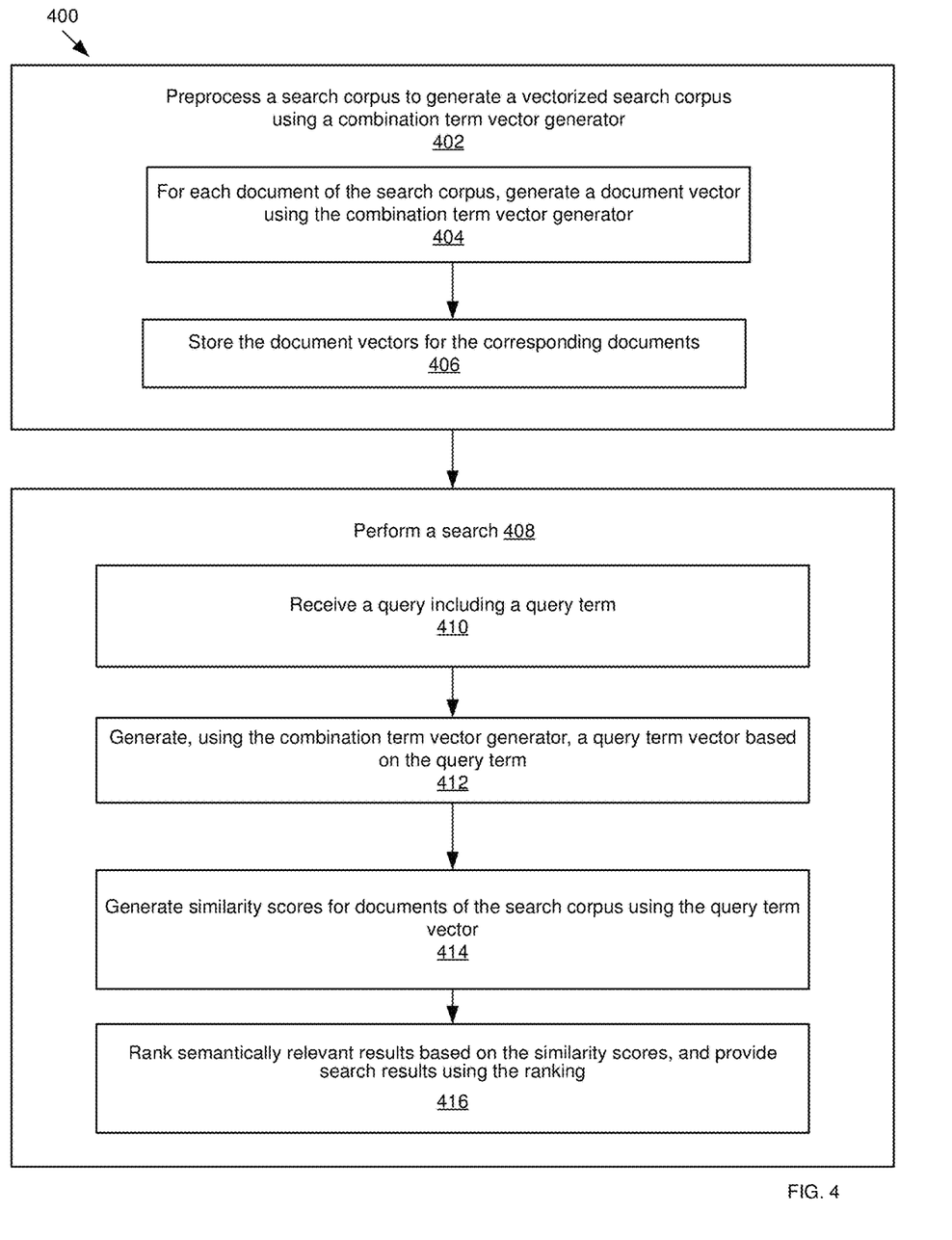
FIG. 4 is a flow chart illustrating a method for performing automated information retrieval using a combination term vector generation system according to some embodiments.
Figure 5:
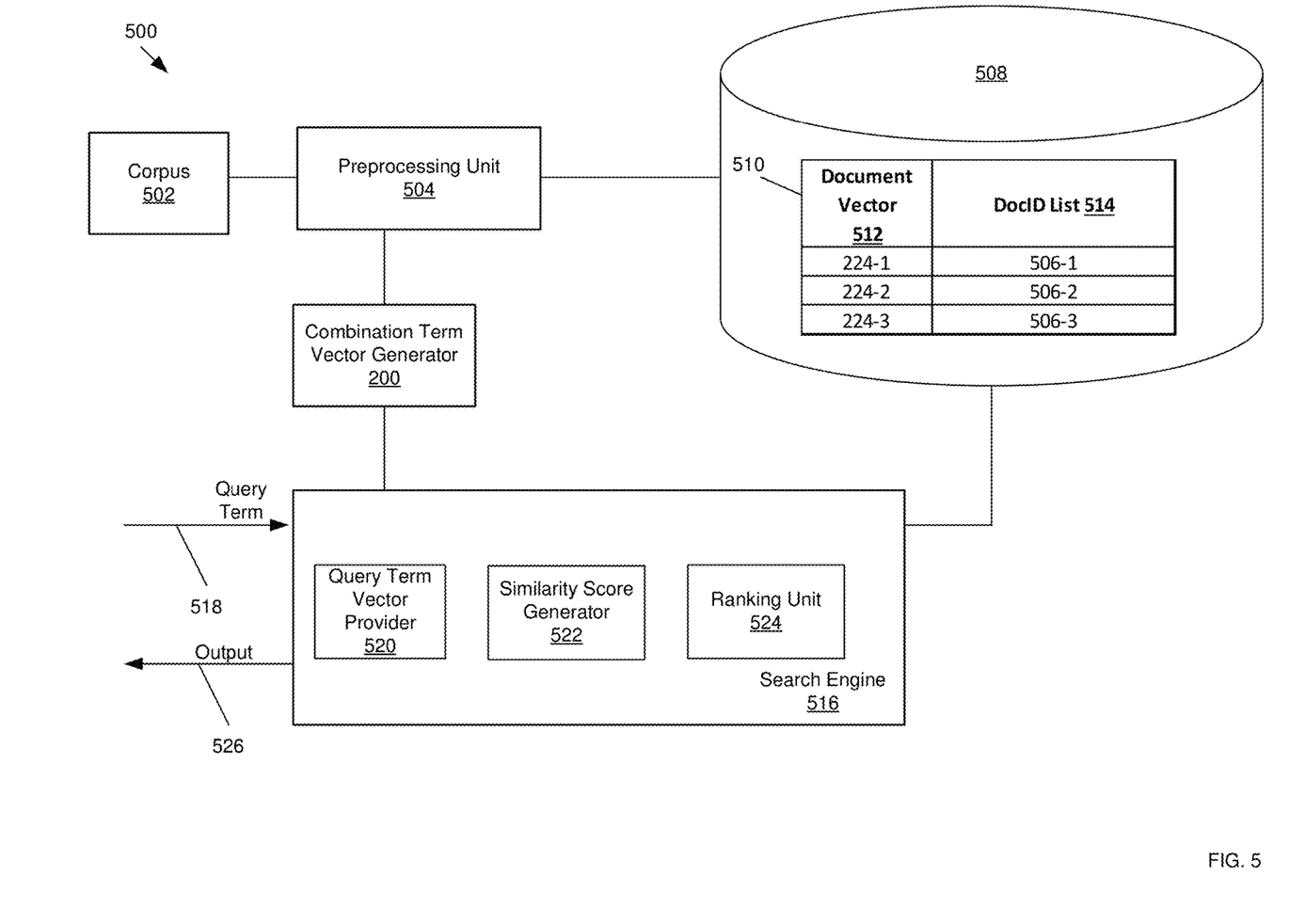
FIG. 5 is a schematic view illustrating an automated information retrieval system according to some embodiments.

Referring to the examples of FIGS. 4 and 5, the combination term vector generation system may be used in an automated information retrieval system for search and content discoveries. FIG. 4 illustrates a method 400 for providing automated information retrieval using a combination term vector generation system (e.g., a combination term vector generation system 200), FIG. 5 illustrates an automated information retrieval system 500 for providing the method 400, and FIG. 6 illustrates example vectors used in providing automated information retrieval.

The method 400 includes a preprocess 402 for preprocessing a search corpus to generate a vectorized (indexed) search corpus using a combination term vector generator (e.g., combination term vector generator 200 of FIG. 2) and a runtime search process 408 for performing a search using the vectorized search corpus based on that combination term vector generator.

Figure 6:
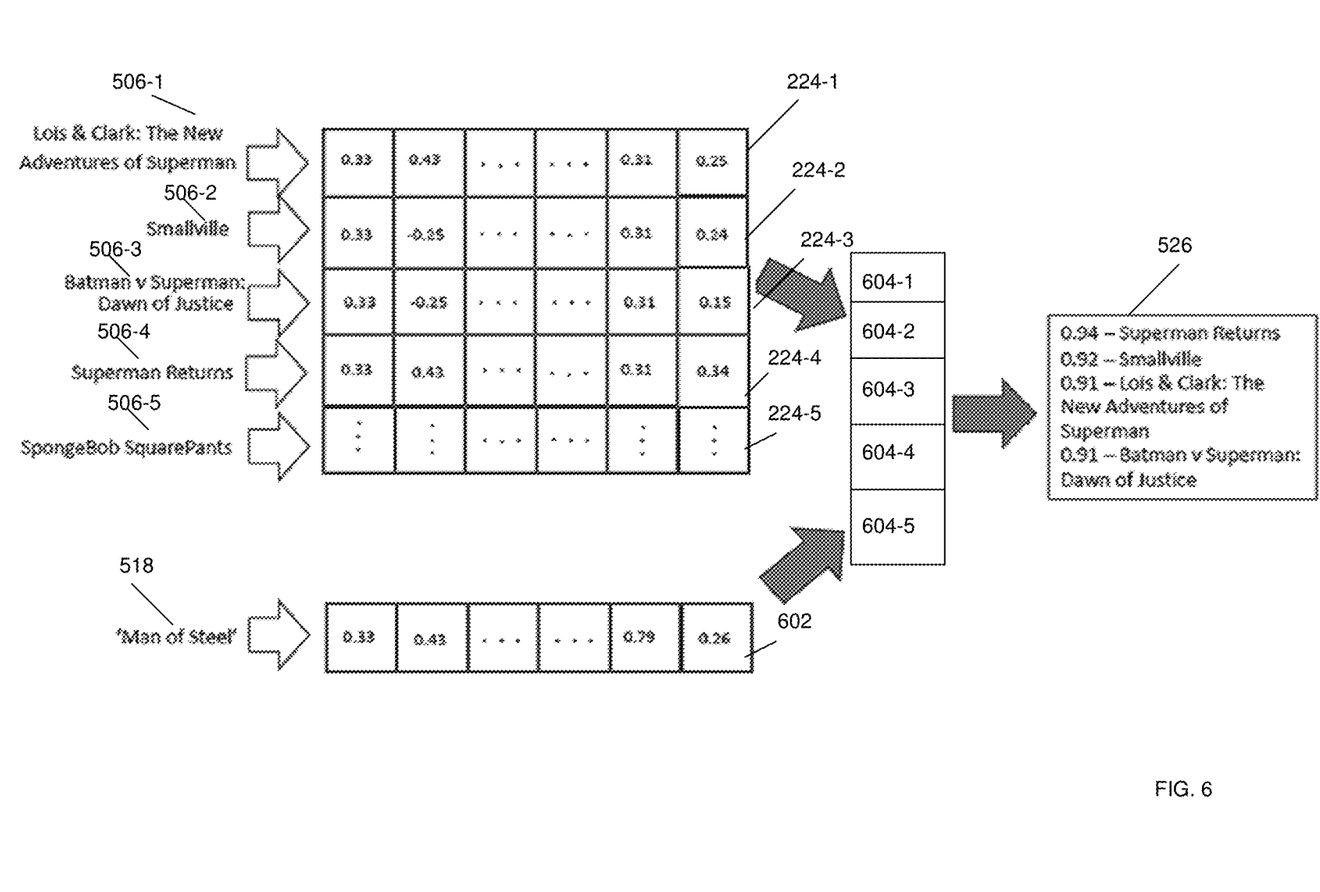
FIG. 6 is a schematic view illustrating vectors used in the method for performing automated information retrieval of FIG. 4 according to some embodiments.

Referring to FIGS. 4, 5, and 6, the preprocess 402 includes block 404, where a preprocessing unit 504 of an automated information retrieval system 500 receives search corpus 502, which includes a large number of documents. Each document may include a term including a sequence of words (e.g., a sentence, a phrase, etc.). At block 404, for each document of the corpus 502, the preprocessing unit 504 generates a document vector using the combination term vector generator 200. In the example of FIG. 6, for documents 506-1, 506-2, 506-3, 506-4, and 506-5 of the corpus 502, the preprocessing unit 504s send the documents to the combination term vector generator 200, and receives document vectors (e.g., combination term vectors) 224-1, 224-2, 224-3, 224-4, and 224-5 respectively.

The preprocess 402 further includes block 406, where the preprocessing unit 504 stores the document vectors (e.g., as keys) for the corresponding documents, e.g., in a document vector table 510 of a vectorized search corpus database 508. In the example of FIG. 5, the document vector table 510 includes columns 512 for document vectors, and document identifier (DocID) list 514. The preprocessing unit 504 stores each document vector (e.g., document vector 224-1, 224-2, or 224-3) and its corresponding document identifier(s) (e.g., document identifiers for documents 506-1, 506-2, 506-3) in the document vector table 510. While the example of FIG. 5 shows that a one to one correspondence between a document vector and a document identifier, in some examples, a document vector may correspond to two or more documents.

After preprocessing the search corpus to generate a vectorized search corpus at preprocess 402, the method 400 may proceed to runtime search process 408 where a search engine 516 of the automated information retrieval system 500 performs a search using the vectorized search corpus database 508. Runtime search process 408 begins at block 410, where the search engine 516 receives a query term 518 (e.g., "Man of steel") from a user. The runtime search process 408 then proceeds to block 412, where a query term vector provider 520 provides the query term 518 to the combination term vector generator 200, and receives a corresponding query term vector 602 (e.g., a combination term vector for the query term).

The runtime search process 408 may proceed to block 414, where a similarity score generator 522 receives the query term vector 602 (e.g., from the query term vector provider 520), and generates similarity scores 604-1 through 604-5 for documents of the search corpus using the query term vector (e.g., by performing dot product computation between the query term vector 602 and document vectors 224-1 through 224-5 of the vectorized search corpus 508 respectively). The similarly scores 604-1 through 604-5 indicate the semantic similarity between the query term 518 and the documents 506-1 through 506-5 respectively. In an example, a higher similarity score indicates a higher semantic similarity, and a lower similarity score indicates a lower semantic similarity. In an example, a similarity score is associated with an angle between the query term vector 602 and a document vector 224-1, and a higher similarity score indicates a smaller angle. Various similarity functions, including e.g., a Cosine similarity function that measures the cosine of the angle between two vectors, may be used to generate the similarity score.

The runtime search process 408 may proceed to block 416, where a ranking unit 524 may receive similarity scores from similarity score generator 522, sort the similarity scores (e.g., similarity scores 604-1 through 604-5), and provide the corresponding top K documents 526 to the user, where K is a predetermined integer. In the example of FIG. 6, the ranking unit 524 determines that the top K (e.g., 4) documents 526 includes document 506-4 (e.g., "Superman Returns") having a similarity score of 0.94, document 506-2 (e.g., "Smallville") having a similarity score 0.92, document 506-1 (e.g., "Lois & Clark: The New Adventures of Superman") having a similarity score 0.91, and document 506-3 (e.g., "Batman v. Superman, Dawn of Justice") having a similarity score 0.91.

It is noted that compared with search methods based on keywords (e.g., exact match or fuzzy match), the search result 526 provided by method 400 using automated information retrieval system 500 may include documents (e.g., "Smallville") that do not include a keyword from the query term 518 but are semantically relevant. Furthermore, by using vector operations (e.g., dot product computation) in the similarity score generator that are less computationally costly than keyword matching, the runtime search process 408 is faster and more efficient. Such vector operations in the similarity score generator may be performed in parallel to further improve the performance.

Figure 7:
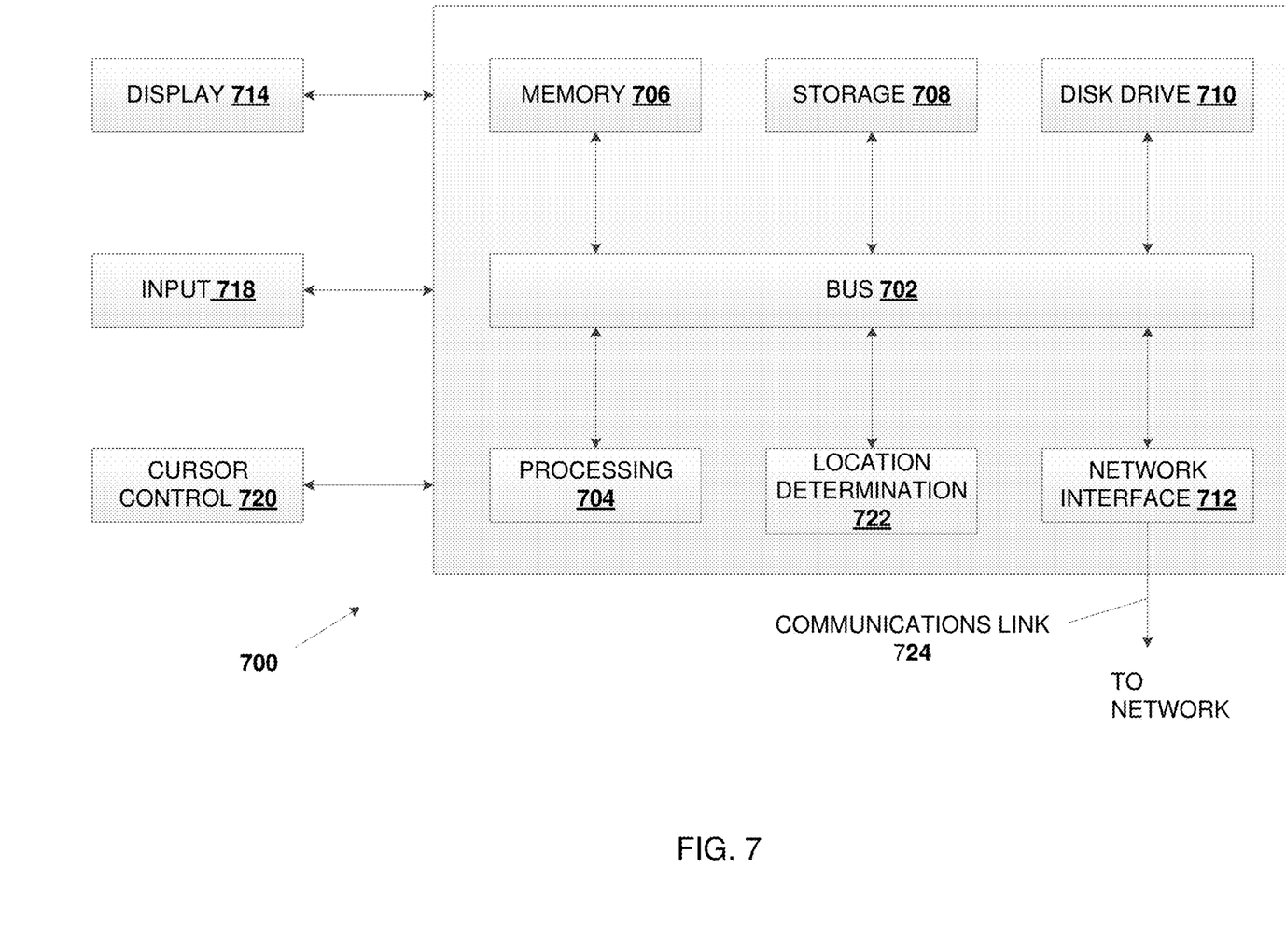
FIG. 7 is a schematic view illustrating an embodiment of a computer system.

Referring to FIG. 7, in some embodiments, during preprocess 402, the preprocessing unit 504 may perform topic clustering to cluster document vectors of a topic together in the vectorized search corpus. For example, the preprocessing unit 504 may determine a topic term vector for a topic term, calculate similarity scores (e.g., by performing dot product) between the topic term vector and document vectors, find an optimal document number M for that topic term, and store the topic term and the corresponding top M document vectors (e.g., corresponding to the top M similarity scores) in a topic index table of the vectorized search corpus database 508. During the runtime search process 408, search results may be provided based on similarity scores computed based on the topic term vectors, which may further improve the efficiency of the runtime search process 408.

The automated information retrieval systems and methods described herein may be used in various applications. In some embodiments, the combination term vector generation may be used to improve clustering algorithms. In an example, in a website service application providing a community forum, the combination term vector generation may be applied to the title of each post/thread to generate a combination term vector. A clustering algorithm (e.g., substantially similar to the similarity score generator 522 and ranking unit 524) may use these combination term vectors to find similar posts/threads and perform automated clustering. Further, in a question and answer system provided in such a website service application, the combination term vector generation may be used in a machine learning model to provide automated answer to a question. In another example, in a customer care chatting application that provides text messages of dialog interactions between customers and customer representatives, the combination term vector generation may be used to generate combination term vectors for each of the customer messages (e.g., sentences), and those combination term vectors may be used in a supervised customer care topic routing classifier to improve the accuracy of automated responses to the customer messages. In yet another example, in a content recommendation system for providing similar movies, TV shows, or music based on a customer's interest, the combination term vector generation may be used to improve the performance of semantically relevant recommendations.

Referring now to FIG. 7, an embodiment of a computer system 700 suitable for implementing, for example, a system provider device providing the automated information retrieval system 500, a user device for providing a query term to and receiving a search result from the automated information retrieval system 500 is illustrated. It should be appreciated that other devices utilized in the automated information retrieval system 500 discussed above may be implemented as the computer system 700 in a manner as follows.

In accordance with various embodiments of the present disclosure, computer system 700, such as a computer and/or a network server, includes a bus 702 or other communication mechanism for communicating information, which interconnects subsystems and components, such as a processing component 704 (e.g., processor, micro-controller, digital signal processor (DSP), etc.), a system memory component 1106 (e.g., RAM), a static storage component 708 (e.g., ROM), a disk drive component 710 (e.g., magnetic or optical), a network interface component 712 (e.g., modem or Ethernet card), a display component 714 (e.g., CRT or LCD), an input component 718 (e.g., keyboard, keypad, or virtual keyboard), a cursor control component 720 (e.g., mouse, pointer, or trackball), and/or a location determination component 722 (e.g., a Global Positioning System (GPS) device as illustrated, a cell tower triangulation device, and/or a variety of other location determination devices.) In one implementation, the disk drive component 710 may comprise a database having one or more disk drive components.

In accordance with embodiments of the present disclosure, the computer system 700 performs specific operations by the processing component 704 executing one or more sequences of instructions contained in the system memory component 706, such as described herein with respect to the drone(s), the drone docking station(s), the service platform, and/or the remote monitor(s). Such instructions may be read into the system memory component 706 from another computer-readable medium, such as the static storage component 708 or the disk drive component 710. In other embodiments, hardwired circuitry may be used in place of or in combination with software instructions to implement the present disclosure.

Logic may be encoded in a computer-readable medium, which may refer to any medium that participates in providing instructions to the processing component 704 for execution. Such a medium may take many forms, including but not limited to, non-volatile media, volatile media, and tangible media employed incident to a transmission. In various embodiments, the computer-readable medium is non-transitory. In various implementations, non-volatile media includes optical or magnetic disks and flash memory, such as the disk drive component 710, volatile media includes dynamic memory, such as the system memory component 706, and tangible media employed incident to a transmission includes coaxial cables, copper wire, and fiber optics, including wires that comprise the bus 902 together with buffer and driver circuits incident thereto.

Some common forms of computer-readable media include, for example, floppy disk, flexible disk, hard disk, magnetic tape, any other magnetic medium, CD-ROM, DVD-ROM, any other optical medium, any other physical medium with patterns of holes, RAM, PROM, EPROM, FLASH-EPROM, any other memory chip or cartridge, cloud storage, or any other medium from which a computer is adapted to read. In various embodiments, the computer-readable media are non-transitory.

In various embodiments of the present disclosure, execution of instruction sequences to practice the present disclosure may be performed by the computer system 700. In various other embodiments of the present disclosure, a plurality of the computer systems 700 coupled by a communication link 724 to a communication network 106 (e.g., such as a LAN, WLAN, PTSN, and/or various other wired or wireless networks, including telecommunications, mobile, and cellular phone networks) may perform instruction sequences to practice the present disclosure in coordination with one another.

The computer system 700 may transmit and receive messages, data, information and instructions, including one or more programs (e.g., application code) through the communication link 724 and the network interface component 712. The network interface component 712 may include an antenna, either separate or integrated, to enable transmission and reception via the communication link 724. Received program code may be executed by processor 704 as received and/or stored in disk drive component 710 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components, and vice versa.

Software, in accordance with the present disclosure, such as program code or data, may be stored on one or more computer-readable media. It is also contemplated that software identified herein may be implemented using one or more general-purpose or special-purpose computers and/or computer systems, networked and/or otherwise. Where applicable, the ordering of various steps described herein may be changed, combined into composite steps, and/or separated into sub-steps to provide features described herein.

The foregoing is not intended to limit the present disclosure to the precise forms or particular fields of use disclosed. As such, it is contemplated that various alternate embodiments and/or modifications to the present disclosure, whether explicitly described or implied herein, are possible. Persons of ordinary skill in the art in possession of the present disclosure will recognize that changes may be made in form and detail without departing from the scope of what is claimed.

What is claimed is:

1. A system comprising:
    a processor; and
    a memory that stores executable instructions that, when executed by the processor, performance of operations, comprising:
        receiving a term comprising words;
        generating, using a combination term vector generator, a combination term vector for the term, wherein generating the combination term vector comprises:
            generating respective word vectors for the words of the term,
            generating a group of term vectors for the term using the respective word vectors of the words of the term, wherein each term vector of the group of term vectors is generated respectively based on different term vector rules using all of the respective word vectors of the words of the term, and
            generating the combination term vector for the term by combining the group of term vectors based on a combination rule; and
        receiving a search result from a data store for the term based on a search using the combination term vector.

2. The system of claim 1, wherein the different term vector rules comprise at least one of an elementwise minimum rule or an elementwise maximum rule, wherein the elementwise minimum rule provides that each element of a term vector comprises a minimum value of corresponding elements of the respective word vectors, and wherein the elementwise maximum rule provides that each element of the term vector comprises a maximum value of corresponding elements of the respective word vectors.

3. The system of claim 1, wherein the different term vector rules comprise an elementwise mean value rule, and wherein the elementwise mean value rule provides that each element of a term vector comprises a mean value based on corresponding elements of the respective word vectors.

4. The system of claim 3, wherein the elementwise mean value rule is an elementwise weighted mean value rule providing a weighted mean value using respective weights for the corresponding elements.

5. The system of claim 4, wherein the respective weights are based on inverse document frequencies associated with the words.

6. The system of claim 1, wherein the operations further comprise:
    normalizing the group of term vectors to generate a group of normalized term vectors; and
    generating the combination term vector by combining the group of normalized term vectors.

7. The system of claim 6, wherein the combination rule provides that the combination term vector is generated by concatenating the group of normalized term vectors.

8. The system of claim 1, wherein the operations further comprise:
    preprocessing the data store to generate a vectorized database, wherein preprocessing the data store comprises:
        for each document of the data store, generating a document vector using the combination term vector generator, resulting in document vectors, and storing the document vectors as an index to the corresponding document.

9. The system of claim 8, wherein the operations further comprise:
generating similarity scores between the document vectors and the combination term vector, and
wherein receiving the search result comprises receiving at least one document based on the similarity scores.

10. A method, comprising:
receiving, by a system comprising a processor, a term comprising a group of words;
generating, by the system using a combination term vector generator, a combination term vector for the term, wherein generating the combination term vector comprises:
generating respective word vectors for the words of the group of words of the term,
generating a group of term vectors for the term using the respective word vectors of the words of the term, wherein each term vector of the group of term vectors is generated based on a different term vector rule, of term vector rules, using all of the respective word vectors of the words of the term, and
generating the combination term vector for the term by combining the group of term vectors based on a combination rule; and
enabling, by the system, access to a search result from a database for the term based on a query using the combination term vector.

11. The method of claim 10, wherein the term vector rules comprise at least one of an elementwise minimum rule or an elementwise maximum rule, wherein the elementwise minimum rule provides that each element of a term vector comprises a minimum value of corresponding elements of word vectors of the respective word vectors, and wherein the elementwise maximum rule provides that each element of the term vector comprises a maximum value of corresponding elements of word vectors of the respective word vectors.

12. The method of claim 10, wherein the term vector rules comprise an elementwise mean value rule, and wherein the elementwise mean value rule provides that each element of a term vector comprises a mean value based on corresponding elements of word vectors of the respective word vectors.

13. The method of claim 10, wherein the elementwise mean value rule is an elementwise weighted mean value rule providing a weighted mean value using a respective weights for the corresponding elements, and wherein the respective weights are based on inverse document frequencies of the words of the group of words.

14. The method of claim 10, further comprising:
normalizing, by the system, the group of term vectors to generate a group of normalized term vectors; and
generating, by the system, the combination term vector by combining the group of normalized term vectors.

15. The method of claim 10, wherein the combination rule provides that the combination term vector is generated by concatenating the group of normalized term vectors.

16. A non-transitory machine-readable medium, comprising executable instructions that, when executed by a processor of a device, facilitate performance of operations, comprising:
receiving a term comprising a group of words;
generating, using a combination term vector generator, a combination term vector for the term, wherein generating the combination term vector comprises:
generating respective word vectors for the words of the group of words of the term,
generating a group of term vectors for the term using the respective word vectors of the words of the term, wherein each term vector of the group of term vectors is generated based on a different term vector rule, of term vector rules, using all of the respective word vectors of the words of the term, and
generating the combination term vector for the term by combining the group of term vectors based on a combination rule; and
obtaining a search result from a data store for the term based on a search query using the combination term vector.

17. The non-transitory machine-readable medium of claim 16, wherein the different term vector rules comprise at least one of an elementwise minimum rule or an elementwise maximum rule, wherein the elementwise minimum rule provides that each element of a term vector comprises a minimum value of corresponding elements of word vectors of the respective word vectors, and wherein the elementwise maximum rule provides that each element of the term vector comprises a maximum value of corresponding elements of word vectors of the respective word vectors.

18. The non-transitory machine-readable medium of claim 16, wherein the different term vector rules comprise an elementwise weighted mean value rule providing a weighted mean value using respective weights for the corresponding elements, and wherein the respective weights are based on inverse document frequencies of the words of the group of words.

19. The non-transitory machine-readable medium of claim 16, wherein the operations further comprise:
preprocessing the data store to generate a vectorized data store, wherein preprocessing the data store comprise:
for each document of the data store, generating a document vector using the combination term vector generator, resulting in document vectors and
storing the document vectors as an index to the corresponding document.

20. The non-transitory machine-readable medium of claim 19, wherein the operations further comprise:
generating similarity scores between the document vectors and the combination term vector, and
wherein obtaining the search result comprises obtaining at least one document based on the similarity scores.

* * * * *